(12) United States Patent
Dufal et al.

(10) Patent No.: US 6,183,141 B1
(45) Date of Patent: Feb. 6, 2001

(54) MINIMIZING PROGRAM CODE STORAGE FOR PERFORMING REGULAR AND REPETITIVE OPERATIONS IN A PROGRAMMABLE PROCESSOR

(75) Inventors: Frédéric Dufal, Grenoble; Gilles Privat, Meylan, both of (FR)

(73) Assignee: France Telecom, Paris (FR)

( * ) Notice: Under 35 U.S.C. 154(b), the term of this patent shall be extended for 0 days.

(21) Appl. No.: 08/603,620

(22) Filed: Feb. 21, 1996

(30) Foreign Application Priority Data

Feb. 23, 1995 (FR) .................................................. 9502131

(51) Int. Cl.[7] ................ G06F 9/22; G06F 9/38
(52) U.S. Cl. .................. 395/800.23; 395/376; 395/379; 395/391; 395/567
(58) Field of Search .................... 395/800, 390, 395/391, 379, 382, 375, 392, 376, 567, 800.23

(56) References Cited

U.S. PATENT DOCUMENTS

| | | | |
|---|---|---|---|
| 4,766,566 | * | 8/1988 | Chuang ............................... 395/800 |
| 5,333,280 | * | 7/1994 | Ishikawa et al. ..................... 395/375 |
| 5,398,321 | * | 3/1995 | Jeremiah ............................. 395/392 |
| 5,430,851 | * | 7/1995 | Hirata et al. ........................ 395/388 |
| 5,465,373 | * | 11/1995 | Kahle et al. ......................... 395/391 |
| 5,465,377 | * | 11/1995 | Blaner et al. ....................... 395/800 |
| 5,491,829 | * | 2/1996 | Kau et al. ........................... 395/800 |
| 5,504,932 | * | 4/1996 | Vassiliadis et al. ................. 395/800 |

* cited by examiner

*Primary Examiner*—Meng-Ai T. An
(74) *Attorney, Agent, or Firm*—Fulbright & Jaworski L.L.P.

(57) ABSTRACT

The program memory comprises a first segment (MP1) containing a succession of program words including first base words (MMA) each having a size less than the sum of the respective sizes of the control words destined for the execution units (UXi), and second base words (MMB) fewer in number than that of the first base words. Facilities sequentially extract the various program words from the first segment of the program memory. A storage facility (RG) is connected to the output of the program memory. Facilities (MXM) update the content of the storage facility at least on the basis of each extracted second base word, and computational facilities (MEB) sequentially compute certain at least of the various groups of control words, on the basis of the combining according to at least one predetermined logic relation, of the content of the storage facility and of an extracted first base word, so as to minimize the memory size of the said program code.

16 Claims, 6 Drawing Sheets

MINIMIZING PROGRAM CODE STORAGE FOR PERFORMING REGULAR AND REPETITIVE OPERATIONS IN A PROGRAMMABLE PROCESSOR

TECHNICAL FIELD

The invention relates to the simultaneous command of the control statuses of a plurality of execution units of a programmable processor, on the basis of a program code stored in a program memory, so as in particular to minimize the memory size of the program code.

The invention applies advantageously but not limitingly to hardware architectures dedicated to implementing, relatively regular and repetitive, intensive numerical processing operations, for example in the processing of animated images, in particular in multi-media communication applications.

BACKGROUND

Conventionally the instructions of a programmable processor code the control statuses thereof, these control statuses fixing the operating configurations of the data path.

The global control status of the processor varies in each cycle of the clock signal on the basis of which it is clocked. When the instructions of the program code which are contained in the program memory are intended simultaneously to control the control statuses of several distinct hardware resources, commonly designated under the generic term of execution units, the control status varies locally in each clock cycle as a function of the various execution units. These execution units can for example be arithmetic and logic units, multipliers, adders or even controllable facilities for inter-connecting the previously mentioned elements, such as multiplexers.

Command of all the possible control statuses on the basis of a succession of instruction words each consisting of the control words intended to command respectively, directly and simultaneously, the various execution units, would be possible but would lead to a very considerable size of the program code, and consequently to the use of a large program memory.

SUMMARY

The aim of the invention is to afford a solution to this problem and to minimize the memory size of the program code on the basis of which the control statuses of the execution units are simultaneously controlled, and hence to reduce the amount of hardware for the program memory.

The aim of the invention is also to allow the simultaneous and independent command of all the execution units whilst fully utilizing the useful field of the control words.

The invention therefore proposes a process for the simultaneous command of the control statuses of a plurality of execution units of a programmable processor, in which groups of control words destined for the various units are generated in succession on the basis of a program code stored in a program memory. According to a general characteristic of the invention, a first segment at least of the program code is stored in a first segment of the program memory, comprising a succession of program words including first base words each having a size less than the sum of the respective sizes of the respective group of control words, and second base words fewer in number than that of the first base words. The various program words are extracted sequentially from this first segment of the program memory.

A storage facility is provided whose content is updated at least on the basis of each second extracted base word, and certain at least of the various groups of control words are computed sequentially on the basis of the combining according to at least one predetermined logic relation, of the first extracted base words and of the content of the storage facility. The memory size of the program code is thus minimized.

Stated otherwise, the invention provides in particular for structuring the program code into instructions (first base words) and into directives (second base words). Each instruction is then valid for a single clock cycle whilst the content of the storage facility remains valid in general for a longer duration covering several clock cycles, since it is updated by the directives which are fewer in number than the instructions.

In the sense of the present invention, the expression "update" should be interpreted in a very broad sense encompassing in particular a substituting of at least some bits of the content of the storage facility by some bits at least of the relevant directive, or else the modifying of the content of the storage facility by a logic function defined by the directive, for example an inversion of bits.

Each control word assigned to an execution unit is then obtained from the logical combining of an instruction and of the content of the storage facility updated by the directives. Here again, the term "combining" should be taken in a very general sense, including a straightforward juxtaposing of bits and/or a concatenating of bits and/or a true combining according to a logic function of some at least of the bits of the instructions and directives.

The size of the instructions, and advantageously of all the program words of the program code, which is less than the sum of the elementary sizes of the control words required for command of the execution units, as well as a number of directives which is fewer than that of the instructions, thus leading to a "time factoring" of these directives, make it possible to compact the memory size of the program code.

According to a variant of the invention, each first base word of the program code comprises a block of first instruction words (or "instructions") which are mutually independent and respectively assigned to the plurality of execution units, whilst each second base word represents a second instruction word (or "directive") assigned to at least one execution unit. The storage facility is subdivided into a plurality of elementary storage facilities assigned respectively to the plurality of execution units, and whose respective contents are respectively updated at least on the basis of the second corresponding instruction words and, according to a second logic relation assigned specifically to each execution unit, certain at least of the control words assigned to this execution unit are computed sequentially on the basis of the first corresponding instruction words and of the content of the elementary storage facility assigned to this execution unit.

Thus in this variant, the first segment of the program memory contains directly the instructions and directives on the basis of which certain at least of the groups of control words destined for the execution units will be computed.

According to another variant of the invention, on the basis of the combining according to a first predetermined logic relation, of each first extracted base word and of the content of the storage facility, there is computed a program sub-word including a block of first instruction words which are mutually independent and respectively assigned to the plurality of execution units, and/or at least one second instruction word assigned to at least one execution unit. A plurality of elementary storage facilities assigned respectively to the plurality of execution units, and whose respective contents are respectively updated at least on the basis of the second corresponding instruction words are furthermore provided and, according to a second logic relation assigned specifically to each execution unit, certain at least of the control words assigned to this execution unit are computed sequentially on the basis of the first corresponding instruction words and of the content of the elementary storage facility assigned to this execution unit.

Stated otherwise, according to this variant there is provided an additional hierarchy within the structure of the program code. More precisely, the process according to the invention makes it possible to extract, from the program memory, instructions and directives "of higher order" (first and second base words) on the basis of which instructions and directives "of lower order" (first and second instruction words) are computed which will themselves lead to the computation of various control words.

The first and second instruction words can be computed simultaneously or sequentially.

In one or the other of the variants, there is advantageously provision, in the presence of a program word (first variant) or of a program sub-word (second variant) different from a block of first instruction words, for the control words to be computed on the basis of the combining, according to the said second predetermined logic relations, of a first additional instruction word with pre-established content and of the contents of the elementary storage facilities.

In practice this pre-established instruction content is chosen, having regard to the logic combining relation, in order to lead after combining with the content of the elementary storage facility or facilities, to the obtaining of one or more control words specifying an absence of action by the relevant execution unit or units.

There is preferably also provision, in one or the other of the variants, for a second segment in the program memory, containing second additional instruction words (prerecorded additional directives for example) assigned to at least one execution unit. In the presence of a program word or sub-word different from a second instruction word (directive), a second additional instruction word, on the basis of which the content of the corresponding elementary storage facility is updated, is possibly extracted from the second segment of the program memory.

Such a mode of implementation makes it possible to minimize the idle times in respect of the delivery of a directive in general. Moreover, it is particularly advantageous to place in this second segment of the program memory, pre-recorded directives which are invoked in a repetitive manner. Their repetitive storage in the first segment of the program memory is then avoided, thus contributing further to optimizing the memory size of the program code.

Moreover, it may also prove particularly advantageous to modify at least a segment of the content of one at least of the second instruction words or of the second additional instruction words extracted from the program memory before its use for the purposes of updating the content of one or more elementary storage facilities.

Such a modification, when it is manifested as a substituting of certain bits of the directives by bits originating from parameters outside the processor, makes it possible easily to parametrize the command of the control statuses of the execution units by external data without complex provision of additional hardware facilities.

In the variant of the invention providing for an additional hierarchy within the structure of the program code, and in a manner analogous to what was described earlier in respect of the instructions and directives of lower order, in the presence of an extracted program word different from a first base word, the program sub-word is advantageously computed on the basis of the combining according to the said predetermined logic relation, of a first additional base word with preestablished content and of the content of the storage facility.

Provision may also be made in the program memory for at least one third segment containing third additional base words, and in the presence of a program word extracted from the first segment of the program memory and different from a second base word, a third additional base word, on the basis of which the content of the storage facility is updated, is possibly extracted from the third segment of the program memory.

It is also possible to modify at least a segment of the content of one at least of the second base words extracted from the program memory and the content of the storage facility is updated on the basis of the second modified base word.

The subject of the invention is also a device for the simultaneous command of the control statuses of a plurality of execution units of a programmable processor, comprising a program memory and command facilities, connected between the program memory, and the execution units, and able to generate in succession groups of control words destined for the various units on the basis of a program code contained in the program memory. According to a general characteristic of the invention the program memory comprises a first segment containing a succession of program words including first base words each having a size less than the sum of the respective sizes of the control words, and second base words fewer in number than that of the first base words. The command facilities include facilities for extracting the various program words sequentially from the first segment of the program memory, a storage facility connected to the output of the program memory, facilities for updating the content of the storage facility at least on the basis of each second extracted base word, and computational facilities able to compute sequentially certain at least of the various groups of control words, on the basis of the combining according to at least one predetermined logic relation, of the content of the storage facility and of a first extracted base word, so as to minimize the memory size of the said program code.

According to one embodiment of the invention, each first base word includes a block of first instruction words which are mutually independent and respectively assigned to the plurality of execution units, whilst each second base word represents a second instruction word assigned to at least one of the execution units. The storage facility includes a plurality of elementary storage facilities, connected to the output of the program memory, and respectively assigned to the various execution units whilst the updating facilities include a plurality of elementary updating facilities able to respectively update the contents of the elementary storage facilities on the basis of the corresponding second instruction words (designating these storage facilities). The computational facilities include a plurality of elementary computational facilities each computing sequentially the various successive control words of an execution unit, on the basis of the combining according to a second predetermined logic relation specific to the said unit, of the first corresponding instruction words and of the content of the elementary storage facility assigned to the said unit.

Each program word preferably includes an identifier allowing its identification as either a first instruction word or as a second instruction word, as well as a useful segment. The command facilities include selection facilities, controlled by the identifier of each program word, and including a first input for receiving the program words, a first output connected to the elementary computational facilities, and a second output connected to the elementary updating facilities.

The program memory may also include a second segment containing second additional instruction words, and the selection facilities include another input connected to the output of the second segment of the program memory.

According to another embodiment of the invention, the computational facilities sequentially compute program sub-words each including a block of first instruction words which are mutually independent and respectively assigned to the plurality of execution units, and/or at least one second instruction word assigned to at least one execution unit. The command facilities furthermore include a plurality of elementary storage facilities, connected to the output of the computational facilities, and respectively assigned to the various execution units, as well as a plurality of elementary updating facilities able to respectively update the contents of the elementary storage facilities on the basis of the second corresponding instruction words. The command facilities furthermore include a plurality of elementary computational facilities each computing sequentially the various successive control words of an execution unit, on the basis of the combining according to a predetermined logic relation specific to the said unit, of the first corresponding instruction words and of the content of the elementary storage facility assigned to the said unit.

Each program word preferably includes an identifier allowing its identification as either a first base word or as a second base word, as well as a useful segment, and the command facilities include upstream selection facilities, controlled by the identifier of each program word, including a first input for receiving the program words, a first output connected to the computational facilities, and a second output connected to the updating facilities.

The program memory advantageously includes a third segment containing second additional base words, and the upstream selection facilities include another input connected to the output of the third segment of the program memory.

Each program sub-word advantageously includes an identifier allowing its identification as either a first instruction word or as a second instruction word, as well as a useful segment, and the command facilities include selection facilities, controlled by the identifier of each program sub-word, including a first input for receiving program sub-words, a first output connected to the elementary computational facilities, and a second output connected to the elementary updating facilities.

Here again the program memory advantageously includes a second segment containing second additional instruction words, and the selection facilities include another input connected to the output of the second segment of the program memory.

In one or the other of the embodiments, certain at least of the second instruction words or certain at least of the second additional instruction words advantageously include a designation area for one or more units to which they are assigned, a status area, and a useful segment. The elementary storage facility corresponding to the said designation area includes several elementary sub-storage facilities corresponding to the various possible values of the status area, and the elementary updating facilities include updating sub-facilities able to update the content of the elementary sub-storage facility designated by the status area on the basis of the useful segment of this second instruction word or of this second additional instruction word.

According to another embodiment of the invention, one at least of the control words of each group includes a first segment containing several bits emanating directly from the bits contained in an elementary storage facility and a second segment whose bits result from a combining of the content of this elementary storage facility and of a first instruction word. The execution unit controlled by this control word includes execution sub-units controlled by control sub-words each including a different bit of the first segment of the control word as well as the bits of the second segment of the control word.

It is thus possible to control several execution units simultaneously and independently on the basis of a single computed control word.

DRAWINGS

Other advantages and characteristics of the invention will emerge on examining the detailed description of modes of implementation and embodiments of the invention, which are in no way limiting, and are illustrated in the appended drawings in which.

DETAILED DESCRIPTION

Figure 1:
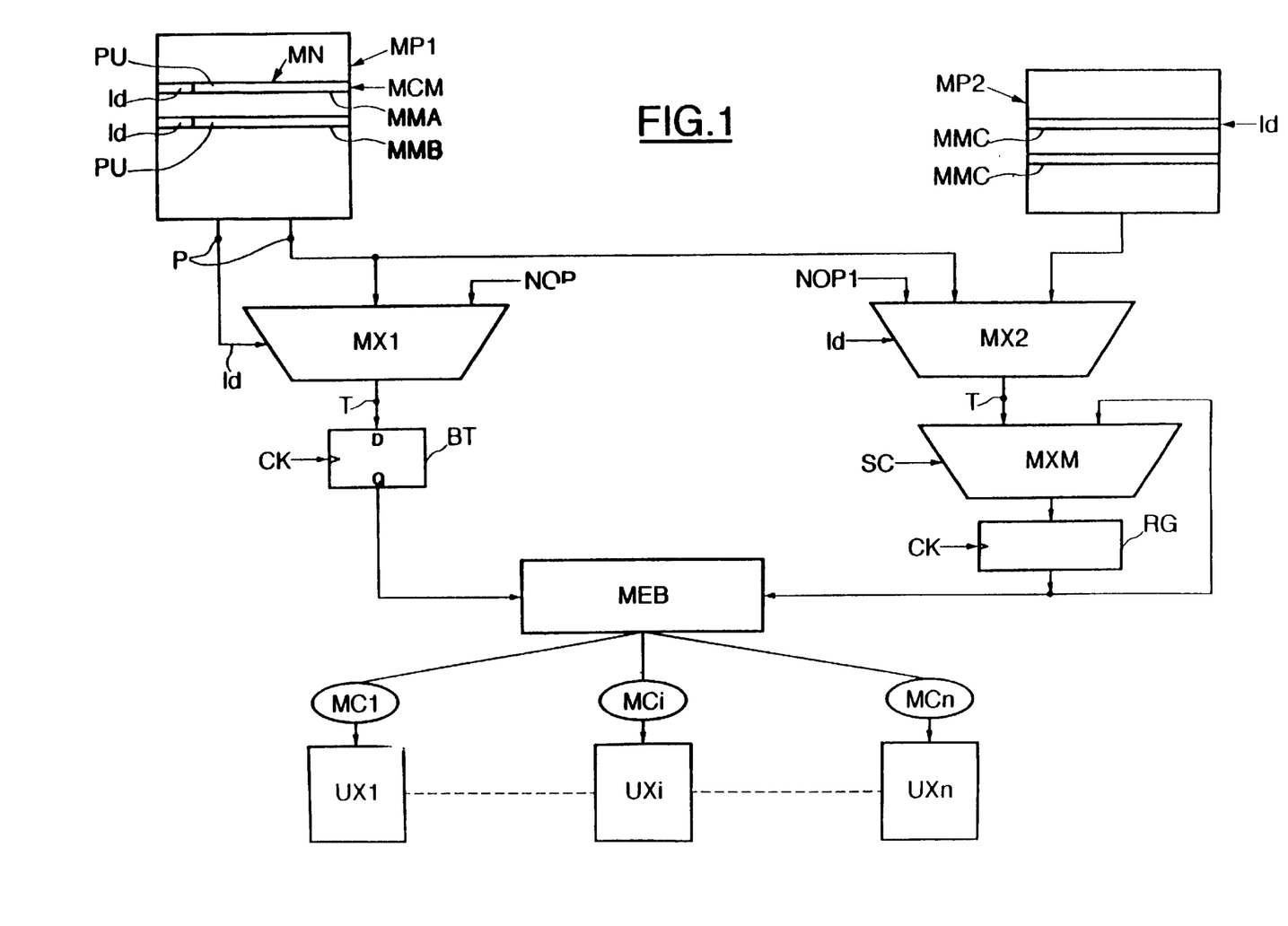
FIG. 1 illustrates diagrammatically a first embodiment of a device according to the invention allowing a first mode of implementation of the process according to the invention.

As illustrated in FIG. 1, the device according to the invention includes a program memory formed by a main memory MP1 and an ancillary memory MP2. In practice, these two memories are distinct but may be two segments of the same physical memory.

The memory MP1 includes a succession of program words MM on the basis of which will be computed sequentially, in tempo with a clock signal CK, some at least of the various groups of control words MC1-MCn intended to fix the various control statuses of the various execution units UX1, UXn of the programmable processor.

The various program words are addressed by command words MCM (program address) emanating for example from an address pointer.

The invention lies here more particularly in the computing of the control words MCi from program words contained in the program memory, given of course that the value proper of the bits of the control words, explicitly defining the control statuses of a processor programmed in a specific manner for a specific application, depend on the values of the bits of the various program words, as defined by the user during the actual programming of the processor in respect of the said specific application.

This special computing of the control words makes it possible to optimize the length of the program code contained in the program memory, and hence the size of this program memory.

Indeed, if it is assumed for example, for simplification purposes, that each control word must be coded over b bits in order to define the corresponding control status of an execution unit, and if a structure of the program code were adapted making provision, for each program word MM to include n control words MCi in juxtaposed manner, each program word would therefore have a length of n.b bits.

In this embodiment, each program word MM has a size less than n.b bits, thus already leading to a reduction in the size of the program memory.

Each program word MM can be either a first base word MMA or a second base word MMB, the significance of which will be explained below. In practice, each program word MMA or MMB (hereinafter collectively referred to as "MM" includes an identifier Id, coded over one or more bits, and making it possible to identify the program word as a first base word or as a second base word, as well as a useful segment PU including in particular a parameter field whose value will be defined by the user when programming the processor.

Very generally, each first base word MMA represents an instruction whilst each second base word MMB represents a directive. A directive will be used to update the content of a storage facility such as a register RG, by way of updating facilities formed in the example described here by a multiplexer MXM whose input is connected to the output of the register RG. Thus, in this example, the concept of "update" entails storage of certain at least of the bits of a directive, in the register RG so as to thus modify its content.

The various control words MCi will then be computed in a general manner on the basis of the instructions forwarded by the memory MP1 and on the basis of the content of the register RG. This computing is performed by computational logic facilities MEB implementing a predetermined logic relation effected for example by logical synthesis.

So as to direct a directive to the register RG and an instruction to the corresponding input of the computational facilities MEB, provision is made in a general manner for selection facilities commanded on the basis of the identifier Id of each program word MM. These selection facilities are represented here by two multiplexers MX1 and MX2, one of the respective inputs of which is for example wired directly to the memory MP1 so as to receive the useful segment of the program word. Moreover, the identifying area of each program word is wired, possibly by way of a decoder, to the command input of these multiplexers MX1 and MX2. Thus, when a program word MM is extracted from the memory MP1 in each clock cycle, by way of an address pointer, the useful segment of this program word is, depending on the identifier, either used to update the storage facility RG, should it be a directive, or sent, by way of a time barrier BT formed here by flip-flops D (in fact as many flip-flops D as bits in the delayed word), to the computational facilities MEB.

In the presence of an extracted program word whose id identifies it as not being an instruction, provision is then made for the forwarding to the computational facilities MEB, of a pre-established additional instruction NOP on the basis of which the various control words MCi will be computed in combination with the content of the register RG. In practice, this instruction NOP, the values of the bits of which are frozen in a hardware manner, for example by connecting to earth or to the power supply, is chosen so that the combining of this instruction NOP with the content of the register RG, by the computational facilities, leads to the computation of predetermined control words specifying an absence of action in respect of the relevant execution unit or units.

Similarly, in the presence of an extracted program word different from a directive, provision is made in this embodiment, in a hard-wired manner for example, for the forwarding at the input of the multiplexer MX2 of a predetermined directive NOP1 manifested as a non-updating of the register RG.

The memory MP2 itself contains second additional base words MMC, representatives for example of prerecorded directives. In practice, it is unnecessary to provide an identifier for these words MMC since directives alone are involved. The length of these words is therefore less than the length of the program words MM contained in the memory MP1. The output of this memory MP2 is connected to the multiplexer MX2.

It is thus possible, in the presence of a program word MM extracted from the memory MP1, that is not a directive, to forward a prerecorded directive MMC so as to update the register RG. The addressing of this memory MP2 can be performed on the basis of the identifier of a program word extracted from the memory MP1.

The forwarding of these pre-recorded directives MMC is not performed systematically when extracting an instruction MMA from the memory MP1, but is performed only for certain of these instructions MMA. This differentiation is performed for example by means of the identifier Id. Thus, if it is assumed that the identifier is coded over at least 2 bits, and that the value 0 is assigned to a directive and the value 1 or a value greater than or equal to 2 to an instruction, it may for example be decided that the forwarding of the pre-recorded directives with a view to updating the register RG will be carried out only simultaneously with the extracting of instructions whose identifier has a value greater than or equal to 2.

When an instruction whose identifier is equal to the value 1 is extracted from the memory MP1, the command signal SC of the multiplexer MXM configures the latter onto its input connected to the output of the register RG, so as to keep the content of the register RG unchanged, hence stated otherwise, so as not to update the latter.

It should be noted here that the time barrier BT is indispensable in the device according to the invention only when the latter actually includes an ancillary memory MP2.

Those skilled in the art will have understood that since the directives MMB are fewer in number than that of the instructions MMA, the content of the register RG may remain unchanged for several clock cycles. In fact, a time factoring of the directives in the program memory is thus carried out, these directives then defining retentive statuses for the various execution units, valid over several clock cycles. This contributes further to reducing the length of the program code contained in the program memory, since, conventionally, it would have been necessary to repeat several times the information conveyed to the program memory by these directives.

Figure 2:
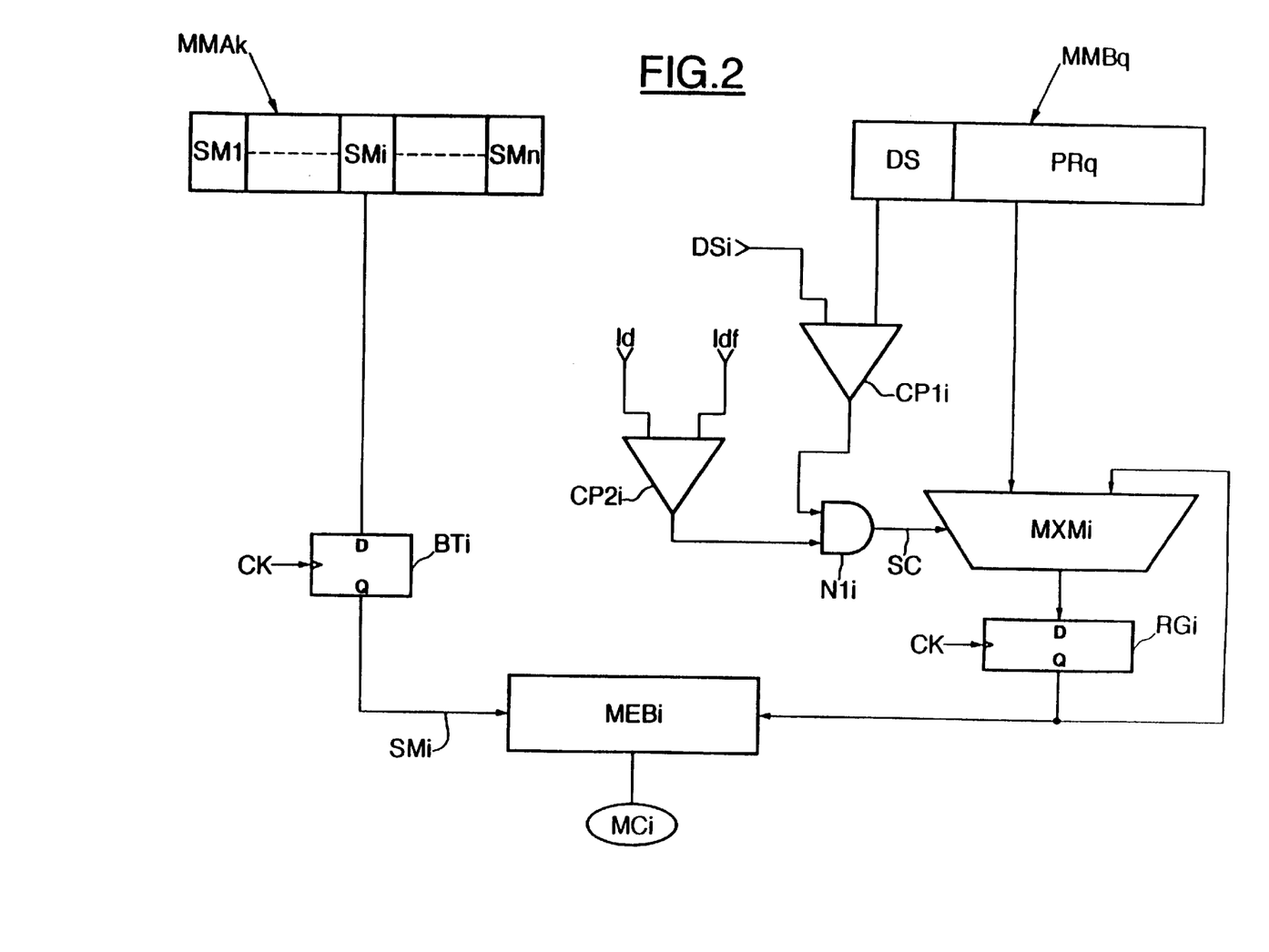
FIG. 2 illustrates in greater detail the mode of implementation and embodiment of FIG. 1.

In FIG. 2, the useful segment PU of each first base word MMAk is partitioned into a plurality of first instruction words (instruction) SM1-SMn assigned respectively to the various execution units UX1-UXn.

Similarly, the useful segment PU of each second base word, or of each second additional base word, MMBq is a second instruction word (directive, or pre-recorded directive), including a designation area DS actually designating one at least of the execution units to which this directive is assigned, as well as a parameter field PRq. To each execution unit UXi is then assigned an elementary computational facility MEBi effecting a logical combining specific to this execution unit. Of course, several of these facilities MEBi may be identical.

Similarly, to each execution unit UXi is assigned an elementary storage facility RGi connected to elementary updating facilities MXMi formed here by a multiplexer.

Each first instruction word SMi is directly connected, possibly by way of a flip-flop BTi, to the corresponding input of the facility MEBi, for example by hard-wiring. The parameter field PRq of each extracted directive is connected, likewise by hard-wiring, directly to one of the inputs of each multiplexer MXMi assigned to each register RGi.

Moreover, the command signal SC of each multiplexer MXMi emanates for example from an AND logic gate referenced N1i, one of the inputs of which is connected to the output of a comparator CP1i comparing the value of the designation area DS with the value DSi specifically associated with the register RGi. The other input of the AND gate is connected to the output of another comparator CP2i comparing the value of the identifier of the program word extracted from the memory MP1 with a predefined identifier Idf corresponding to the directive NOP1.

If the designation area DS of the directive MMBq corresponds to DSi and if this directive MMBq is not in fact a directive NOP1, the parameter field PRq is stored in the elementary register RGi.

If by contrast the area DS does not correspond to DSi the multiplexer MXMi is switched onto its other input so as to overwrite the register RGi with the previous value. The parameter field PRq will then be forwarded to the elementary register corresponding to the execution unit whose value DS corresponds to that contained in the directive.

Figure 3:
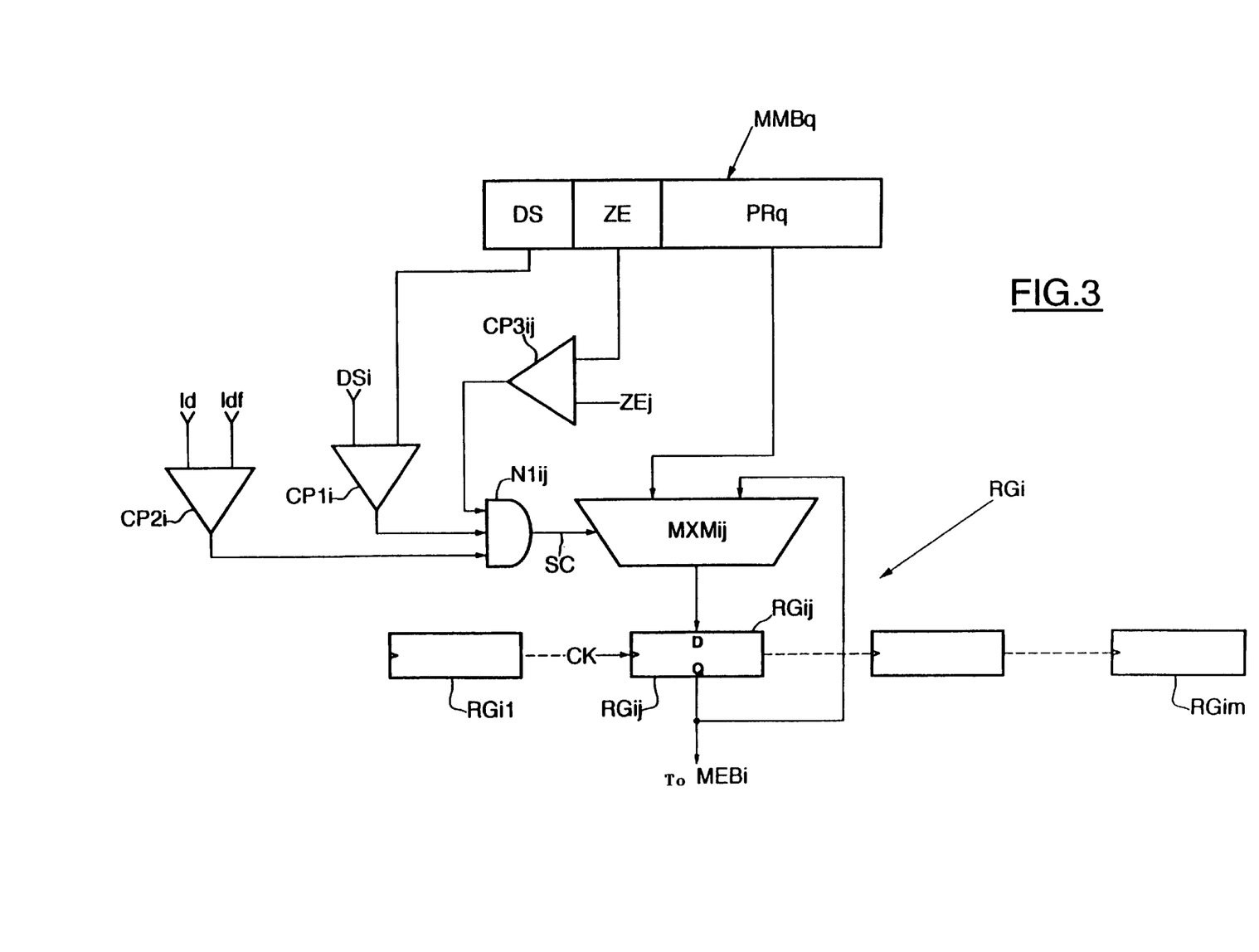
FIG. 3 illustrates in greater detail a variant of the mode of implementation of FIG. 2.

As a variant, as illustrated in FIG. 3, certain at least of the elementary registers RGi may be broken down into several elementary sub-registers RGi1-RGim. The multiplexer MXMi then breaks down into a plurality of sub-multiplexers MXMij respectively assigned to each of the elementary sub-registers. The useful segment of a directive, or of a pre-recorded directive MMBq then includes, apart from the designation area DS and the parameter field PRq, a status area or sub-designation area ZE which will be compared, in a comparator CP3ij, with the value ZEj assigned to the elementary sub-register RGij. If the value ZE corresponds to the value ZEj, the parameter field PRq is stored in the elementary subregister RGij. If by contrast this value is different from ZEj, the parameter field, which is likewise hard-wired to all the other elementary sub-registers, will be stored in the sub-register whose status value corresponds to that of the directive.

Such a variant embodiment, which leads to partial updating of certain of the elementary storage facilities, makes it possible to provide registers of very great length, and in any event of length greater than the length of the directives. The content of such an elementary register may then be fully updated several times.

Figure 4:
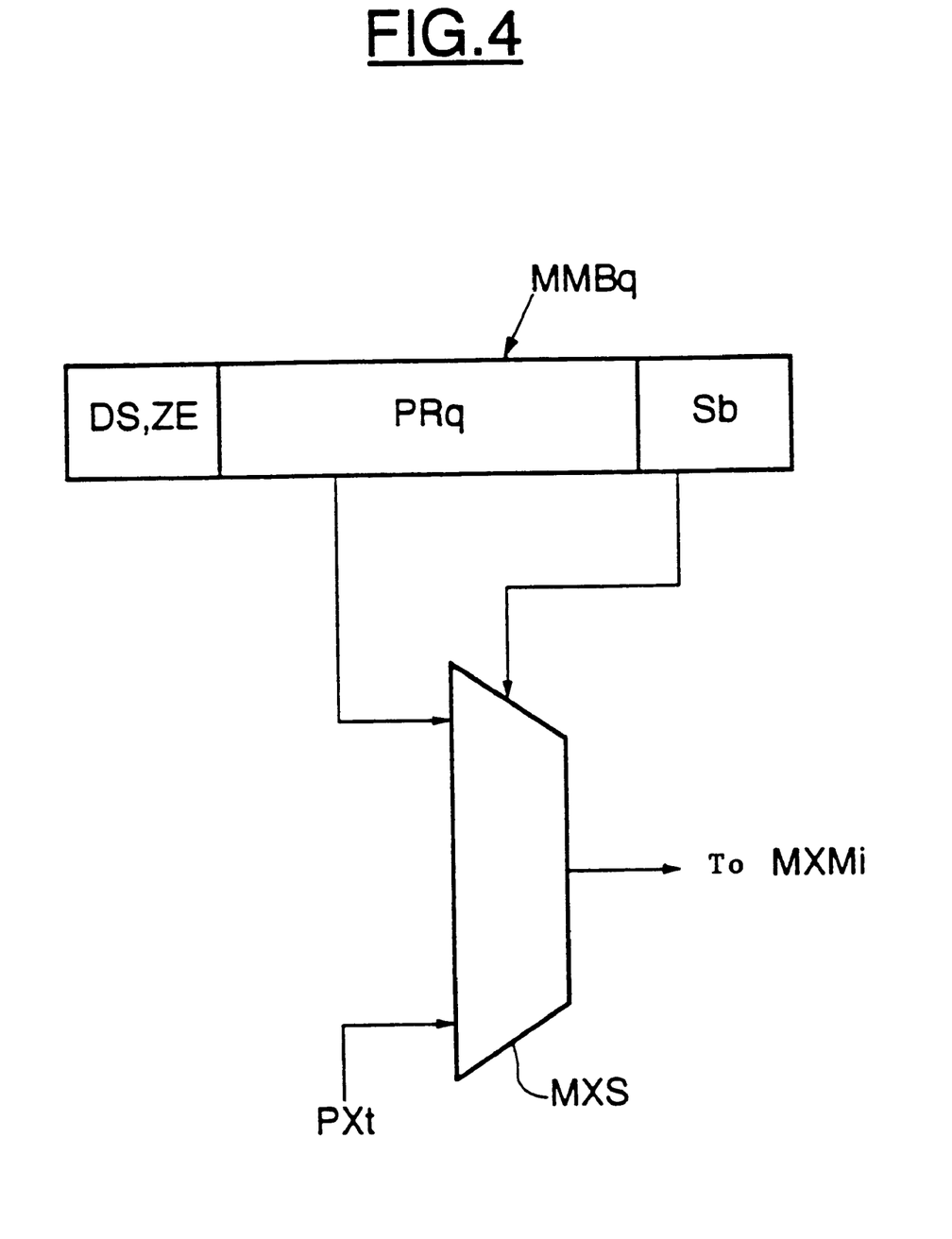
FIG. 4 illustrates diagrammatically an embodiment of a substituting of outside parameters in a directive.

In the variant implementation illustrated in FIG. 4, there is provision for the useful segment of a directive to include, apart from a designation area, a status area and the parameter field Rq, a substitution field Sb. This substitution field Sb will then control a substitution multiplexer MXS so as to substitute certain at least of the bits of the parameter field PRq by exterior bits PXt originating for example from the result of an operation performed by an execution unit. The output of this multiplexer MXS is then connected to the various multiplexes MXMi so as to update the elementary sub-register designated by the area DS and the status area ZE of the directive MMBq.

Figure 5:
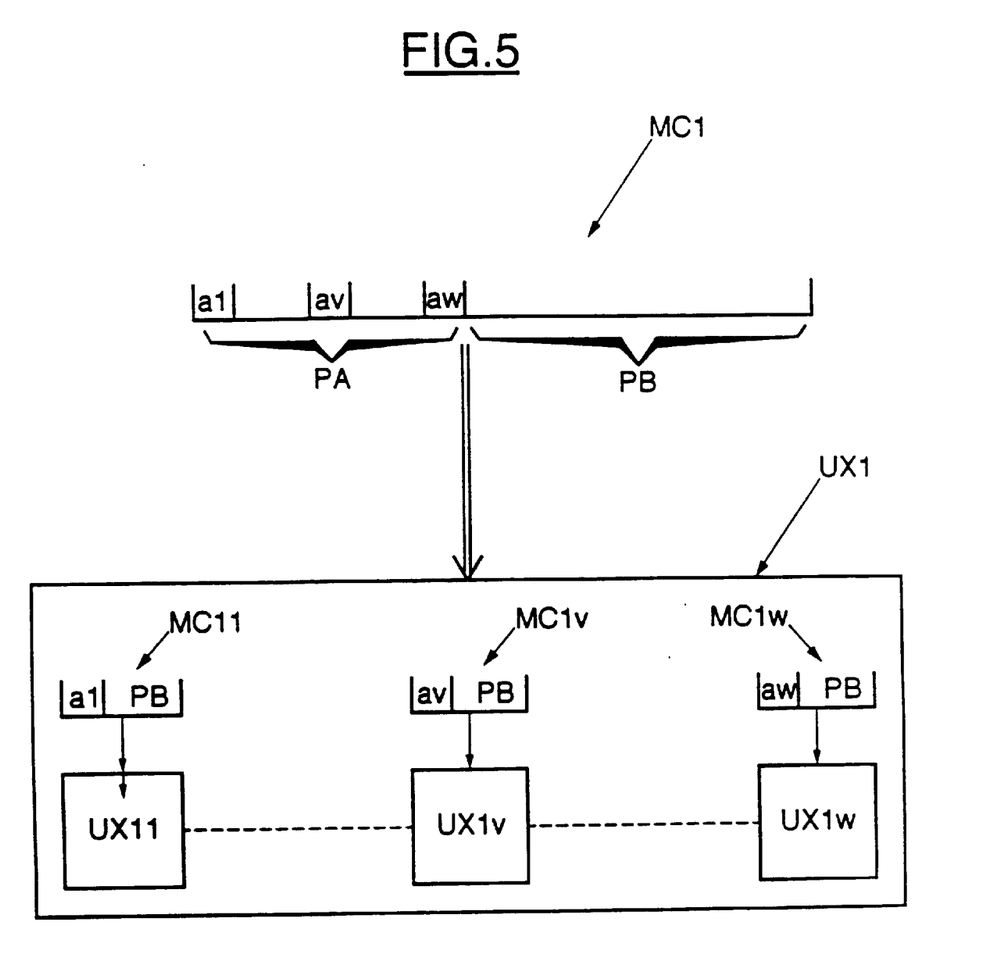
FIG. 5 illustrates diagrammatically an embodiment of the device according to the invention more particularly applicable to SIMD ("Single Instruction Multiple Data") machines.

In the variant embodiment illustrated in FIG. 5, one of the execution units, for example the unit UX1, is in fact composed of several independent execution sub-units UX11–UX1w.

The computational logic facilities MEB1 assigned to the unit UX1, then compute a control word MC1 including a first segment PA composed of bits a1-aw, all different, and a second segment PB. The bits of the segment PA emanate directly from the content of the elementary register RG1 whilst the bits of the segment PB may possibly form the subject of a logical combination between the bits of the content of the register RG1 and the corresponding instruction.

The hard-wiring between the output of the facilities MEB1 and the command inputs of the various sub-units UX11-UX1w is such that each sub-unit UX1v is commanded by a control word MC1v one of the bits of which is equal to one of the bits of the segment PA of the word MC1 and the remainder of the bits of which is formed by bits of the segment PB. The various control words MC11–MC1w are thus distinguished from one another by bits a1–aw.

Figure 6:
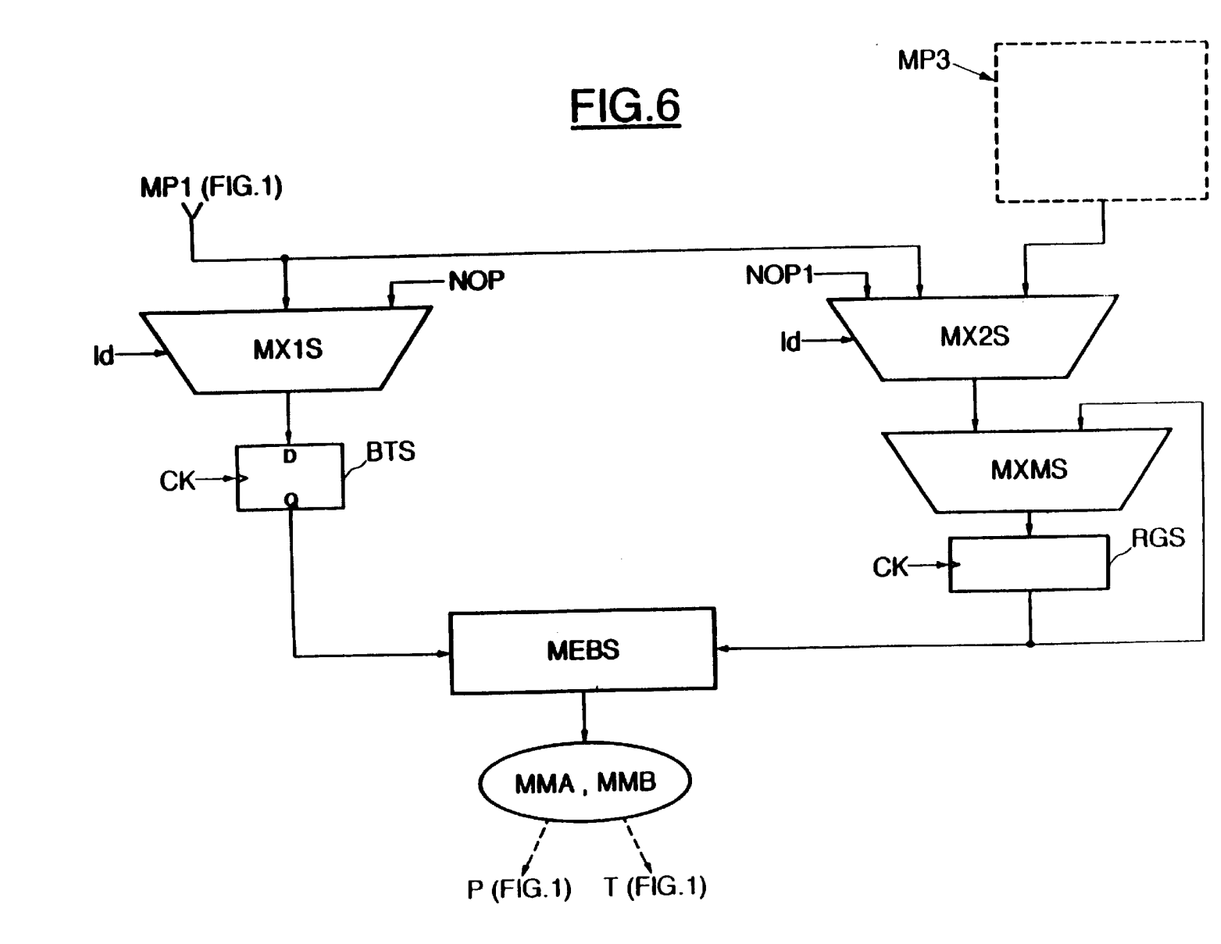
FIG. 6 illustrates diagrammatically a second embodiment and implementation of the invention.

FIG. 6 illustrates a variant embodiment and implementation of the invention providing for a greater degree of hierarchy within the structure of the program code.

In fact, the command facilities include, apart from the elementary computational facilities, the elementary storage registers and the elementary updating facilities just described, upstream selection facilities MX1S and MX2S connected respectively to upstream computational facilities MEBS by way of a time barrier BTS and of an upstream storage register RGS associated with an updating multiplexer MXMS.

In this variant embodiment, the first base words contained in the memory MP1 in fact represent higher-order instructions whilst the second base words represent higher-order directives. In a manner analogous to what was explained above, each higher-order directive will update the register RGS and the computational facilities MEBS will compute, according to another predetermined logic relation, program sub-words containing a block of first instruction words (instructions) and/or a second instruction word (directive) which will be used in the facilities described with reference to the preceding figures in order to compute the various control words.

Each program sub-word may be built up sequentially of either a directive or an instruction. In this case, the output of the computational facilities MEBS is connected to the points P of FIG. 1.

It is also possible to envisage each program sub-word as simultaneously containing an instruction and a directive. In this case, the output of the computational facilities MEBS can be connected to the points T of FIG. 1.

Furthermore, in the case of a connection to the points P, there may also be provided a third ancillary memory MP3 containing prerecorded higher-order directives.

We claim:

1. Process for the simultaneous control of a plurality of execution units of a programmable processor, in which control words destined for different said execution units are generated in succession from a program code stored in a program memory, comprising the steps:

storing at least a first segment of the program code in a first segment of the program memory in the form of a succession of program words, said succession of program words including a first plurality of first base words and a second plurality of second base words, each first base word corresponding to a respective group of one or more of the control words, and each first base word having a size less than the sum of the control word of the sizes of the respective group, said second plurality of second base words being fewer in number than the first plurality of the first base words said first plurality, extracting sequentially said program words from said first segment of the program memory, providing a storage facility, at least partially updating a current content of the storage facility in response to each extracted second base word to thereby form an updated content, and sequentially generating each said group of control words by using a predetermined logic relation to combine a respective extracted first base word with a respective updated content of the storage facility.

2. Process according to claim 1, wherein
at least some of the first base words are blocks of mutually independent first instruction words, each first instruction word of a particular said block being assigned to a different one of said execution units, at least some of the second base words are second instruction words each assigned to at least one of said execution units, the storage facility is subdivided into a plurality of elementary storage facilities, each elementary storage facility being assigned to a different one of said execution units, each elementary facility having a respective content which is updated in response to each extracted second instruction word that is assigned to that elementary facility, and said sequentially generating step comprises using a different respective predetermined logic relation for each execution unit to combine a respective assigned mutually independent extracted first instruction word with a respective current content of the respective assigned elementary storage facility.

3. Process according to claim 2, wherein
said sequentially generating step further comprises, in response to an extracted said first base word which is not one of said blocks, combining a pre-established null instruction word with the contents of the elementary storage facilities.

4. Process according to claim 2, further comprising the steps
providing in the program memory a second segment containing second additional instruction words each assigned to one or more respective execution units, extracting a corresponding second additional instruction word from the second segment of the program memory in response to an extracted base word which is not one of said blocks of first instruction words and which is not one of said second instruction words, and updating a current content of a respective assigned elementary storage facility in response to each extracted second additional instruction word.

5. Process according to claim 2, wherein
each of said program words includes
an identifier portion identifying the program word as either a first instruction word or as a second instruction word, and
a useful segment containing data used to generate at least a portion of at least one of the control words.

6. Process for the simultaneous control of a plurality of execution units of a programmable processor, in which control words destined for different said execution units are generated in succession from a program code stored in a program memory, comprising the steps:

storing at least a first segment of the program code in a first segment of the program memory in the form of a succession of program words, said succession of program words including a first plurality of first base words and a second plurality of second base words, each first base word corresponding to a respective group of one or more of the control words and each base word having a size less than the sum of the control word of the sizes of the respective group, said second plurality of second base words being fewer in number than said first plurality of the first base words, extracting sequentially said program words from said first segment of the program memory, providing a common storage facility, updating a current content of said common storage facility in response to each extracted second base word to thereby form a respective updated content, providing a plurality of elementary storage facilities, each elementary storage facility being assigned to a different one of said execution units, and sequentially generating each said group of control words by
using a first predetermined logical relationship to combine each of the respective extracted first base words with the respective undated contents of the common storage facility to thereby generate a block of first instruction words which are mutually independent, each said first instruction word being assigned to a respective execution unit, and also to thereby generate a plurality of second instruction words each assigned to at least one execution unit, updating a respective content of each elementary facility in response to each generated second instruction word that is assigned to that elementary facility, and using a second logic relation assigned specifically to each execution unit to combine a respective generated first instruction word that is assigned to that execution unit with a respective content of the respective assigned elementary storage facility.

7. Process according to claim 6, wherein the first and second instruction words are computed sequentially.

8. Process according to claim 6, wherein
said sequentially generating step further comprises, in response to an extracted base word which is not one of said blocks, combining a pre-established null instruction word with the current content of the common storage facility.

9. Process according to claim 6, further comprising:
providing in the program memory a third segment containing third additional base words,
extracting a plurality of corresponding third additional base words from the third segment of the program memory in response to an extracted base word which is not one of said first base words and which is not one of said second base words, and updating a current content of the common storage facility in response the extracted third base words.

10. Process according to claim 6, wherein the extracted second base word is modified before the modified second base word is used to update the content of the common storage facility.

11. Process according to claim 6, wherein said sequentially generating step further comprises, in response to a generated instruction word which is not one of said blocks of mutually independent first instructions words, combining a pre-established null instruction word with the contents of the elementary storage facilities.

12. Process according to claim 6, further comprising:

providing in the program memory a second segment containing second additional instruction words each assigned to one or more respective execution units, extracting a corresponding second additional instruction word from the second segment of the program memory in response to an extracted base word which is not one of said blocks of first instruction words and which is not one of said second instruction words, and updating a current content of a respective assigned elementary storage facility in response to each extracted second additional instruction word.

13. Process according to claim 12, wherein at least one of the second additional instruction words is modified before the current content of the corresponding elementary storage facilities are updated.

14. Process according to claim 6, wherein each generated instruction word includes an identifier portion identifying the generated instruction word as either a first generated instruction word or as a second generated instruction word, and a useful segment containing data used to generate at least a portion of at least one of the control words.

15. Process according to claim 14, wherein at least some of said second instruction words include a designation area identifying an assigned one of said elementary storage facility units, a status area, each possible value of the status area identifying a different assigned sub-storage facility of said assigned elemental storage facility, and a useful segment containing data used to update said assigned sub-storage facility.

16. Process according to claim 15, wherein one at least of the control words of each group includes a first segment containing several bits emanating directly from respective bits contained in said assigned elementary storage facility and a second segment which is generated by combining a respective content of the assigned elementary storage facility with a respective generated first instruction word, and each bit of the first segment is associated with a different respective execution sub-unit of said assigned execution unit.

* * * * *